United States Patent [19]

Beckman et al.

[11] Patent Number: 5,004,550
[45] Date of Patent: Apr. 2, 1991

[54] METHOD OF PAINT SLUDGE CONVERSION FOR DISPOSAL

[75] Inventors: John A. Beckman, Plymouth, Mich.; Shu-Jen Huang, Naperville, Ill.; Abdol R. Ebrat, Farmington, Mich.

[73] Assignee: Nalco Chemical Company, Naperville, Ill.

[21] Appl. No.: 470,388

[22] Filed: Jan. 26, 1990

Related U.S. Application Data

[63] Continuation-in-part of Ser. No. 318,308, Mar. 3, 1989, Pat. No. 4,929,382.

[51] Int. Cl.$^5$ .............................................. C02F 11/14
[52] U.S. Cl. .................................... 210/710; 210/712; 210/725; 210/728; 210/736; 210/930
[58] Field of Search .............. 55/85; 134/38; 210/702, 210/712, 723–728, 710, 735, 736, 751, 241, 930; 427/331

[56] References Cited

U.S. PATENT DOCUMENTS

| | | | |
|---|---|---|---|
| 3,515,575 | 6/1970 | Arnold | 210/734 |
| 3,738,945 | 6/1973 | Panzer et al. | 210/736 |
| 4,814,092 | 3/1989 | Patzelt | 210/708 |
| 4,096,061 | 6/1978 | Brennan | 210/728 |
| 4,153,548 | 5/1979 | Forney | 210/726 |
| 4,378,235 | 3/1983 | Cosper et al. | 210/708 |
| 4,389,314 | 6/1983 | Petretti | 210/241 |
| 4,750,919 | 6/1988 | Patzelt et al. | 210/708 |
| 4,854,947 | 8/1989 | Patzelt | 210/708 |

Primary Examiner—Peter Hruskoci
Attorney, Agent, or Firm—Dressler, Goldsmith, Shore, Sutker & MIlnamow, LTD.

[57] ABSTRACT

A method of paint sludge conversion and sludge removal from a sump pit for disposal is provided which is particularly adapted for use with paint waste sludge derived from wet spray booth operations. The method involves blending with the starting sludge caustic, oil and emulsifiers. Water may be added to achieve a desired water to total solids weight ratio. The product is a pumpable liquid disperse system which is easily charged to tankers or the like for pump out from the sludge pit.

8 Claims, 1 Drawing Sheet

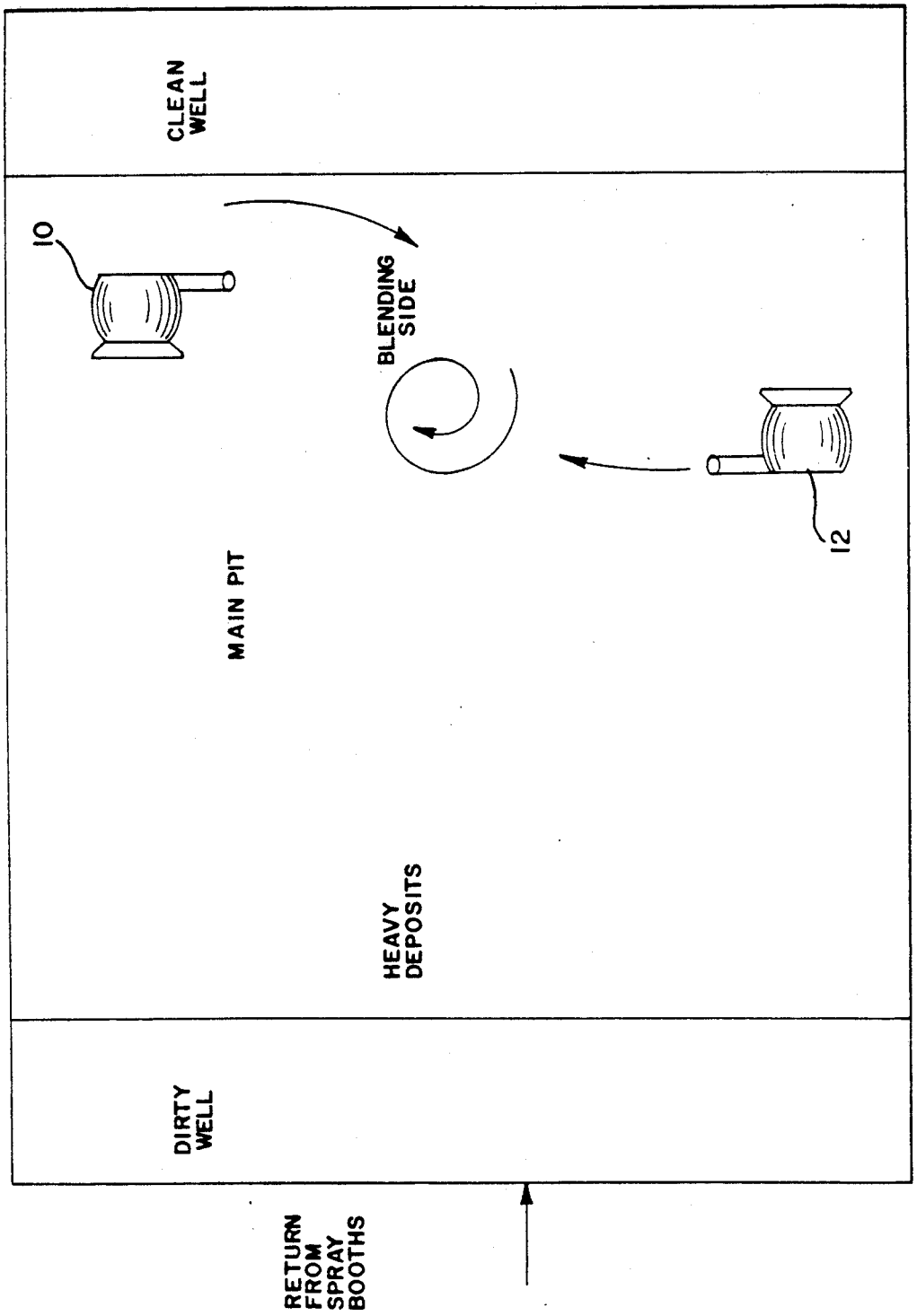

METHOD OF PAINT SLUDGE CONVERSION FOR DISPOSAL

This application is a continuation-in-part of co-pending application Ser. No. 318,308, filed Mar. 3, 1989, now U.S. Pat. No. 4,929,382 for Cationic Coagulants Plus Colloidal Silica for Use in Paint Detackification and owned by a common assignee.

TECHNICAL FIELD

This invention relates to processes for converting paint sludge to a readily pumpable slurry and for cleaning out sludge pits containing paint wastes.

BACKGROUND OF THE INVENTION

A sludge pit is commonly employed to collect paint wastes and residues generated in wet spray booth operations. Such operations are common, for example, in the automotive industry, and the sludge which accumulates is collected in a sludge pit or sludge consolidation equipment in the form of a liquid/solid, semi-solid or solid mass. The sludge is comprised of various liquid and particulate materials, including pigments, dyes, paint vehicles, paint detackifiers, and the like. As described in the aforementioned co-pending application, water typically is present, but the amount can vary depending on the nature of the particular operations being carried out. Periodically, usually annually or semi-annually, a sludge pit must be cleaned out and the sludge removed for environmentally acceptable disposal elsewhere. Most states require removed sludge to be processed as hazardous waste.

Sludge removal has heretofore been conventionally accomplished by known floating, sinking or dispersion and pumping methods. In all such methods, the accumulated sludge, after aging, has become hardened and difficult to remove. For example, percussive equipment (i.e., jack hammers, or the like) frequently must be employed to break up and remove the hardened sludge solids. Even after such removal, the solids present further problems of handling and disposal. Clean out of sludge pits thus is expensive, time consuming and potentially hazardous.

There thus exists a need for new and improved techniques for sludge removal and waste handling.

SUMMARY OF THE INVENTION

The present invention provides a process for the cleaning of a sludge pit containing accumulated sludge, particularly paint sludge, from wet spray booth operations.

The process comprises the steps of:

(a) admixing certain additives with at least a portion of the accumulated sludge;

(b) recirculating and/or agitating the resulting sludge slurry or composition in the sludge pit or an adjacent mix tank; and (c) removing the resulting liquid product from the sludge pit or mix tank.

Steps (a) and (b) may be repeated with successive incremental portions of the accumulated sludge until the pit is substantially completely free of sludge.

The liquid product or dispersion is generally pumped into suitable tank means for conveyance to a remote disposal site.

The additives so admixed include caustic, oil and emulsifier. Water may also be added to achieve a desired water-to total solids weight ratio. As described in the said co-pending application, the water already present in the paint waste sludge typically will contain a detackifying agent.

The present invention further provides a liquid product that is pumpable and transportable and easy to handle for further processing for purposes of disposal and/or recycling.

The invention eliminates or minimizes the need for mechanical processing, including the use of water blasting or percussive devices.

Numerous other advantages and features of the present invention will become apparent from the following detailed description, from the claims and from the accompanying drawing.

THE DRAWING

The FIGURE is a schematic, plan representation of a typical sludge pit arrangement and the relationship of the clean-out invention therewith.

DETAILED DESCRIPTION OF THE INVENTION

Paint waste sludge is typically neutral or slightly basic. In the practice of this invention, there is first added to the accumulated sludge and liquid composition in the pit sufficient caustic to raise the pH to a value in the range of about 8.5 to 12. A sludge composition having an alkaline pH in such range has been found to provide an effective environment for achieving maximum emulsification, with the additives of the invention, to a desired pumpable liquid end product.

The term "caustic" is used herein in its conventional sense to designate hydroxides of a light metal, such as an alkali metal in Group IA of the Periodic Table, or a metal oxide of a Group IIA metal, such as calcium oxide. Presently preferred caustics include sodium hydroxide and/or potassium hydroxide. Depending upon the amount of water present in the starting sludge composition, the caustic may be added in aqueous or solid form, in order to reach the desired pH level. Similarly, additional water may be added as required to insure efficient emulsification and mixing.

The accumulated sludge composition has already admixed therein a detackification agent in accordance with common practices in wet spray booth operations. Preferably, the detackification agent is of the type disclosed and described in the said co-pending application and that disclosure is incorporated herein by reference.

Briefly, the preferred detackification agent comprises:

(a) a water soluble cationic polymeric coagulant having a number average molecular weight less than about 100,000; and (b) an aqueous colloidal silica sol having an average particle size between about 1 and 150 nm, preferably about 1 to 20 nm.

The weight ratio of the polymeric coagulant to the silica sol is in the range of 1:50 to 50:1, and preferably from 1:5 to 5:1.

The preferred coagulant is a water-soluble polymer formed by the reaction of epichlorohydrin dimethylamine and ammonia and has a number average molecular weight of about 50,000.

Liquid pumping and recirculating means are employed for admixing the sludge composition with caustic, water and other additives. While numerous pumping and mixing arrangements are available, it is presently preferred to suspend a pair of relatively high powered, commercially available pumps commonly known as sludge guzzlers from beams positioned over the pit. The guzzlers are then lowered into the pit and positioned in opposed relationship to produce a circular or rotative flow current that serves to effectively agitate the sludge composition and admix the various additives therewith. To that end, the guzzlers may be provided with suitable extension arms and the like for positioning and directing flow into desired areas and nullifying undesirable eddy effects and stagnant zones.

Referring to the FIGURE, it will be seen that the typical sludge pit comprises a large central main pit having a dirty well at the intake side thereof for receiving the waste-carrying return from the spray booths, and a clean well at the opposite side for recirculating the water and detackifier back to the spray booths. In general, the bottom wall of the sludge pit slopes downwardly from the dirty well to the clean well, or from left to right as viewed in the FIGURE.

For practice of the invention, sludge guzzlers 10 and 12 may be positioned as illustrated and all of the various additives and recirculating liquids introduced adjacent the intake of the guzzler 10, it being understood that the guzzlers are movable and positionable as required. Preferably, one of the guzzlers, such as 12, will be sufficiently powerful to pump the liquid end product from the pit to waiting tank cars or trucks for transport.

Following introduction and admixing of the caustic and water, there is introduced into the pit a liquid additive comprising an oil and one or more emulsifying agents or emulsifiers. The oil desirably comprises an inexpensive and readily available product, such as second or reclaimed oil that has a high boiling point and relatively low viscosity. The term "emulsifier" is used herein in its conventional sense to designate a substance added to solid-in-liquid or liquid-in-liquid systems to separate individual particles and thereby form a dispersion of solids in liquid, or an emulsion of liquid droplets in liquid, or a combination of both. A presently preferred emulsifier for practice of the invention is oleic acid. The oil additive may also contain a dibasic ester co-solvent obtainable from Nalco Chemical Company under the trade designation 8083.

In presently preferred practice, one of the liquid emulsifying additives is a product comprising 100 second oil and oleic acid and obtainable from Nalco Chemical Company under the trade designation of 1WP-019, and consisting of 90-95% oil and 5-10% oleic acid by volume. This additive is used with Nalco's product 8083. The proportion of 1WP-019 to 8083 is on the order of 3:1 to 11:1 by volume.

The liquid emulsifying additives are thoroughly admixed and recirculated in the pit until a liquid slurry end product of desired stability and homogeneity is obtained which is pumpable and easily handled. The end product therefore comprises a liquid dispersion system having an aqueous continuous phase and a disperse phase of particles and liquid oil droplets.

In general, practice of the process is carried out over a number of days so that it is preferred that a substantial portion of any liquid product disperse system initially produced be transferred to a holding tank, such as the clean well, for continuous and subsequent blending and recirculation with the sludge residuals until substantially complete sludge removal is achieved.

Occasionally, offensive odors resulting from microbiological growth may occur. In such event, commonly available biocides may be added for control.

The invention will now be described more specifically with reference to a working example. This invention is not limited to the example described, but may be practiced otherwise without departing from the spirit of the concepts of the invention.

EXAMPLE

At a rectangularly configured sump pit that was filled with an estimated sludge volume of about 175,000 gallons derived from adjacent wet spray booth operations, two guzzler pumps, each of 2000 gph capacity, were lowered into desired pit positions and recirculation started in an area where sludge liquid existed. The guzzlers were positioned in a manner to achieve circular flow of the sludge slurry or liquid disperse system, and also to achieve a maximum level of mixing and contact between the sludge and additives.

Based on preliminary laboratory work on a sludge sample, it was determined that approximately 50,000 gallons of oil containing 3,500 gallons oleic acid and 5,000 gallons of Nalco 8083 would effectively solubilize and disperse the sludge deposits in the pit.

Caustic in the form of a mixture of sodium hydroxide and potassium hydroxide, sold as Nalco 8735, was added until the pH in the pit was around 11.5. During mixture of the caustic and agitation of the pit, it was observed that sufficient liquid was present for emulsification.

Eight truck loads of hydrocarbon oil containing oleic acid, in the form of 1WP-019, totaling 46,500 gallons, and 1 truck load of dibasic ester 8083 totaling 5,000 gallons were slowly charged concurrently over a three day period into the pit in the region of the intake of one guzzler which was being used for recirculation.

One day after such addition was begun, the pit was examined to determine the condition of the desired liquid disperse system being formed. No problems with deposition and resettling of particulates were observed, but some settling of particles comparable to sand grains in size was observed. However, the deposition sites where such grain particles settled were soft and yielded to slight pressure. The pit wall areas in the peripheries of the guzzlers were observed to have been completely stripped of sludge.

Approximately 30,000 gallons of emulsion or disperse system were pumped into the clean well for intervening storage and subsequent use in blending as hereinbelow described.

Also, although the pH was additionally raised to 11.5 to promote emulsification and disperse system formation, because aluminum tankers were being used for removal of the disperse system from the pit site, the pH of the liquid disperse system after initial formation was lowered to below 9.0 to prevent deterioration of the tanker metal.

After the third day of such recirculating, or approximately one week after start-up of the clean out operation, loading of tanker trucks with liquid disperse system was begun. Initially no more than 3 tankers per day were loaded.

At the end of the first week of the pump out process, recirculation was ceased for one day and the lack of agitation caused increase in the viscosity of the emulsion. Additional 8735 caustic was added to raise the pH and promote emulsification.

During the second week of pump out of the liquid disperse system, four tankers per day for four consecutive days were loaded. On the fourth day, the level of sludge in the sump pit was very low and the solids concentration was therefore very high. Previously prepared emulsion or dispersion that was stored in the clean well was pumped back into the main pit for admixture with remaining sludge liquids.

There remained in the sump pit areas of thick, sludge solids which were outside of the area in the sump pit where blending of additives with sludge liquids was taking place. The hard sludge solids area in the pit required mechanical cutting and additional portions of the liquid disperse system in the clean well were pumped back into the sump pit and blended with such resulting cut solids. Concurrent recirculation was carried out with guzzler discharge orifices being reduced from 6 inches to 3 inches to increase the flow pressure. Concurrently, solid sludge pieces were mechanically pushed and shoveled in the pit to the blending site. When such pieces had passed through the guzzler, they were found to be reduced to sizes of approximately $\frac{1}{2}''$ to $1''$ in diameter. Additionally, about 5,000 gallons of additional oil were admixed with the remaining sludge.

However, during the third week of pit pump out, a suspension of sludge particulate solids in the liquid available in the pit could not be maintained apparently because of the high level of paint solids present, even though additional oil was added. In effect, the pit was oversaturated with paint solids. Settling of particulates from the liquid dispersion in all sections of the pit occurred. Although the particulate solids and liquids could be easily mixed, suspension of particulate solids could not be maintained.

To accommodate such high solids, the procedure for loading was changed. Specifically after two tankers were successively loaded, liquid disperse system in the clean well storage was added to the high solids composition in the pit in an amount sufficient to prevent solids supersaturations while the pit liquid was being subjected to recirculation for blending purposes. The resulting mixed liquid disperse system was sufficiently stable to be transferred into tankers and transported to the disposition site, and such pumping was carried out at the rate of about a tanker every 30 minutes whereupon the foregoing blending procedure was repeated.

This procedure of clean well reserve disperse system addition was continued until the level of sludge solids in the pit was reduced to the point where vacuum suction was needed to withdraw liquid material from the pit.

For final removal of residual sludge from the sump pit, vacuum pumping was used after further addition of the clean well reserve disperse system thereto followed by recirculation until homogeneity was achieved.

Finally, all remaining disperse system liquid in the reserve clean well was pumped out with vacuum pumping and the pit concrete walls were scraped clean. In all, 43 tanker truckloads of disperse system were removed from the sump pit.

Alternatively, conversion of the paint sludge into a pumpable slurry may be carried out in a suitable mixing tank outside the pit. For example, the oil and emulsifier may be pumped from a tank car into an empty evacuation truck serving as a mixing tank. Caustic is added to the spray booth pit to achieve the desired pH and the water and solids are metered and sucked from the pit into the evacuation truck. Mixing is carried out in the truck until a homogeneous, pumpable liquid is created which is then pumped to a waiting empty tanker truck for transport. This cycle will be repeated until the sludge pit is empty.

The foregoing specification is intended as illustrative and is not to be taken as limiting. Still other variations within the spirit and the scope of the invention are possible and will readily present themselves to those skilled in the art.

What is claimed is:

1. A method for removal of sludge from a pit employed to collect paint wastes and residues generated in a wet spray booth operation, containing a mixture of accumulated sludge and water comprising the steps of:
   (a) adding a detackification agent comprising:
      (1) a water soluble cationic polymeric coagulant comprising a water soluble polymer formed by the reaction of epichlorohydrin, diethylamine and ammonia and having a number average molecular weight of about 50,000, and
      (2) an aqueous colloidal silica sol having an average particle size between about 1 and 150 nm, the weight ratio of said polymeric coagulant to said silica sol being in the range of 1:5 to 5:1 to form a sludge mixture;
   (b) admixing with at least a portion of the sludge mixture of step (a):
      (2) sufficient caustic to raise the pH of the mixture to a value in the range of about 8.5 to 12,
      (2) sufficient hydrocarbon oil to produce a total solids to liquid volume ratio of about 1:2 to 1:3, and
      (3) a liquid emulsifier having a volume ratio to the oil of about 1:3 to 1:11;
   (c) recirculating the resulting sludge composition in at least a portion of said pit until a pumpable liquid dispersion system is produced, said dispersion system being comprised of:
      (1) an aqueous continuous phase, and
      (2) a disperse system dispersed in such continuous phase comprised of particles and liquid droplets; and
   (d) removing the dispersion from the pit.

2. The method of claim 1 wherein the dispersion is removed from the pit by:
   transferring a first portion of the dispersion system into holding tank means; and
   pumping other portions of the dispersion system from the pit into a mobile tank for transport away from the pit area.

3. The method of claim 2 wherein volumes of said first portion of dispersion system are successively transferred back from said holding tank means to said pit and steps (a), (b) and (c) are repeated until said dispersion system is substantially completely removed from said pit and holding tank means.

4. The method of claim 1 wherein a series of mobile tanks are sequentially filled until said dispersion system is substantially completely removed from the pit.

5. The method of claim 1 wherein said hydrocarbon oil is mixed with an emulsifying agent, the amount of said emulsifying agent to the oil being in the range of 5–10% by volume.

6. The method of claim 5 wherein said emulsifying agent comprises oleic acid.

7. A method for conversion of paint sludge in a pit containing a mixture of paint solids and water comprising the steps of:
   (a) adding a detackification agent comprising:

(1) a water soluble cationic polymeric coagulant comprising a water soluble polymer formed by the reaction of epichlorohydrin, diethylamine and ammonia and having a number average molecular weight of about 50,000, and (2) an aqueous colloidal silica sol having an average particle size between about 1 and 150 nm, the weight ratio of said polymeric coagulant to said silica sol being in the range of 1:5 to 5:1 to form a sludge mixture;

(b) admixing with the sludge mixture of step (a) sufficient caustic to raise the pH of the mixture to a value in the range of about 8.5 to 12;

(c) charging a portion of the mixture of step (b) into a mixing chamber containing:

(1) sufficient hydrocarbon oil to result in a volume ratio of the mixture solids to the liquids of about 1:2 to 1:3;

(2) a liquid emulsifier having a volume ratio to the oil of about 1:3 to 1:4;

(d) agitating and mixing the contents of the mixing chamber until a pumpable liquid dispersion system is produced, said dispersion system being comprised of:

(1) an aqueous continuous phase; and (2) a disperse system dispersed in the continuous phase comprised of particles and liquid droplets; and (e) pumping the liquid dispersion system from the mixing chamber into a mobile tank for transport and disposal.

8. The method of claim 7 wherein steps (b) through (d) are repeated with successive portions of the sludge mixture until the pit is emptied of paint sludge.

* * * * *